United States Patent
Srinivasan

(10) Patent No.: US 11,329,937 B2
(45) Date of Patent: May 10, 2022

(54) IDENTIFYING NON-FOCUS AREA OF CONTENT ITEM AND OVERLAYING ANOTHER CONTENT ITEM ONTO THE NON-FOCUS AREA

(71) Applicant: Rovi Guides, Inc., San Jose, CA (US)

(72) Inventor: Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/170,365

(22) Filed: Feb. 8, 2021

(65) Prior Publication Data

US 2021/0243144 A1 Aug. 5, 2021

Related U.S. Application Data

(63) Continuation of application No. 16/454,627, filed on Jun. 27, 2019, now Pat. No. 10,951,563.

(51) Int. Cl.
*H04L 51/10* (2022.01)
*H04L 51/52* (2022.01)
*G06Q 50/00* (2012.01)
*G06F 3/0481* (2022.01)

(52) U.S. Cl.
CPC ............ *H04L 51/10* (2013.01); *G06F 3/0481* (2013.01); *G06Q 50/01* (2013.01); *H04L 51/32* (2013.01)

(58) Field of Classification Search
CPC ....... G06F 3/0481; G06Q 50/01; H04L 51/10; H04L 51/32
USPC .................................. 715/767, 802
See application file for complete search history.

(56) References Cited

U.S. PATENT DOCUMENTS

| | | | |
|---|---|---|---|
| 5,953,076 A * | 9/1999 | Astle | H04N 5/2723 348/584 |
| 6,392,664 B1 | 5/2002 | White et al. | |
| 7,015,978 B2 * | 3/2006 | Jeffers | H04N 5/2723 348/586 |
| 8,264,544 B1 * | 9/2012 | Chang | H04N 5/272 348/169 |
| 8,281,334 B2 * | 10/2012 | Shan | G06Q 30/02 725/34 |
| 8,369,686 B2 * | 2/2013 | Mei | G06Q 30/0243 386/249 |

(Continued)

OTHER PUBLICATIONS

Ali Borji et al. "Salient Object Detection: A Survey", Computational Visual Media, vol. 5, No. 2, Jun. 2019, 25 pages. (Year: 2019).*

(Continued)

*Primary Examiner* — George C Neurauter, Jr.
(74) *Attorney, Agent, or Firm* — Haley Guiliano LLP

(57) ABSTRACT

Methods and systems are described for identifying a non-focus area of a content item and overlaying another content item onto the non-focus area. A first content item is received. The first content item includes a plurality of frames. A non-focus area of first frame of the first content item is identified. A second content item is overlaid onto the non-focus area of the first frame of the first content. A different non-focus area of a second frame of the second frame of the first content item. As such, the methods and systems provide for additional content that fits into non-focus portions of the content without obscuring portions of the content intended, for example, to attract attention of an audience.

20 Claims, 6 Drawing Sheets

(56) References Cited

U.S. PATENT DOCUMENTS

| | | | | |
|---|---|---|---|---|
| 8,451,380 | B2* | 5/2013 | Zalewski | H04N 21/4307 348/588 |
| 8,654,255 | B2* | 2/2014 | Hua | H04N 21/2365 348/584 |
| 8,665,373 | B2* | 3/2014 | Zalewski | H04N 21/4316 348/588 |
| 8,849,063 | B2* | 9/2014 | Takahashi | H04N 5/2723 382/282 |
| 8,903,909 | B1* | 12/2014 | Marra | G06Q 50/01 709/204 |
| 9,111,287 | B2* | 8/2015 | Liu | G06Q 30/02 |
| 9,237,258 | B2* | 1/2016 | Zalewski | H04N 21/44008 |
| 9,432,703 | B2* | 8/2016 | He | H04N 21/23424 |
| 9,432,722 | B2* | 8/2016 | Gazi | H04N 21/4438 |
| 9,477,965 | B2* | 10/2016 | Popkiewicz | G06Q 30/02 |
| 9,538,049 | B2* | 1/2017 | Zalewski | H04N 21/44012 |
| 10,121,513 | B2* | 11/2018 | Martinez | G06K 9/00744 |
| 10,332,159 | B2* | 6/2019 | Han | H04N 21/23 |
| 10,546,318 | B2* | 1/2020 | Garcia | G06T 7/70 |
| 10,592,752 | B2* | 3/2020 | Harris | G06N 5/02 |
| 10,909,383 | B2* | 2/2021 | Harris | H04N 21/25891 |
| 11,044,521 | B2* | 6/2021 | Dabbiru | G11B 27/34 |
| 11,076,200 | B2* | 7/2021 | Gupta | H04N 21/44008 |
| 11,102,549 | B2* | 8/2021 | Gutman | H04N 21/4882 |
| 11,151,606 | B2* | 10/2021 | Garcia | G06T 7/70 |
| 2005/0031169 | A1* | 2/2005 | Shulman | G06F 16/51 382/104 |
| 2006/0026628 | A1* | 2/2006 | Wan | H04N 21/8456 725/32 |
| 2008/0040370 | A1 | 2/2008 | Bosworth et al. | |
| 2008/0040474 | A1 | 2/2008 | Zuckerberg et al. | |
| 2008/0040673 | A1 | 2/2008 | Zuckerberg et al. | |
| 2011/0178854 | A1* | 7/2011 | Sofer | H04N 21/4314 705/14.4 |
| 2011/0188836 | A1* | 8/2011 | Popkiewicz | G06Q 30/0241 386/278 |
| 2011/0321084 | A1* | 12/2011 | Takahashi | H04N 5/2723 725/32 |
| 2013/0201328 | A1* | 8/2013 | Chung | G06T 5/005 348/143 |
| 2014/0067998 | A1 | 3/2014 | Garcia et al. | |
| 2015/0039603 | A1* | 2/2015 | Alonso | G06F 16/9535 707/728 |
| 2016/0066024 | A1* | 3/2016 | Gaziel | H04N 21/4312 348/564 |
| 2018/0077455 | A1* | 3/2018 | Abou Mahmoud | H04N 21/4223 |
| 2019/0146965 | A1* | 5/2019 | Zack | G06F 16/9535 707/690 |
| 2020/0028924 | A1* | 1/2020 | Bastide | H04L 67/22 |
| 2020/0125671 | A1* | 4/2020 | Li | G06F 40/20 |

OTHER PUBLICATIONS

Tiago Alexandre Fonseca Ribeiro Ferreira. "Entropy-Based Dynamic Ad Placement Algorithms for In-Video Advertising", Jun. 2014, 92 pages. (Year: 2014).*
Tao Mei et al. "AdOn: toward contextual overlay in-video advertising", May 2010, 10 pages. (Year: 2010).*
Tao Mei et al. "VideoSense: A Contextual In-Video Advertising System", IEEE Transactions on Circuits and Systems for Video Technology, vol. 19, No. 12, Dec. 2009, 14 pages. (Year: 2009).*
Nilizadeh Shirin, et al., "Cachet: a decentralized architecture for privacy preserving social networking with caching," In Proceedings of the 8th international conference on Emerging networking experiments and technologies, (2012) pp. 337-348.

* cited by examiner

IDENTIFYING NON-FOCUS AREA OF CONTENT ITEM AND OVERLAYING ANOTHER CONTENT ITEM ONTO THE NON-FOCUS AREA

CROSS REFERENCE TO RELATED APPLICATIONS

This application is a continuation of U.S. patent application Ser. No. 16/454,627, filed Jun. 27, 2019, the entire contents of which is incorporated by reference herein in its entirety.

BACKGROUND

The present disclosure relates to modifying a portion of a social media post, and more particularly, to methods and systems for enhancing the social media post with content that is relevant to the audience of the post.

SUMMARY

The development of social media, and particularly the ability for users to share content (e.g., still images, graphics interchange format (GIF) or similar format images, videos, etc.) with their followers on social networks, have resulted in an immense amount of content being generated and posted to such social networks every day. Much of the content generated typically has focus portions (i.e., the portion(s) of the content including the subject of the content and where the audience's attention is intended to be attracted) and non-focus portions (i.e., the portion(s) of the content that does not include the subject and/or includes the background or other objects that are not intended to draw the audience's attention). Some users, for example, social media influencers, may wish to attract more attention to their posts in order to increase their fame and/or have their posts "liked" by more followers to thereby further increase their audience. Such users may wish to add additional content that is relevant to the audience of their social media posts.

On the other side, the operators of the social networks often allow the users to create accounts and post content to the social networks free of charge. The social networks instead derive their revenue from advertisements placed on their websites and applications (apps), and/or interspersed with the posts in the users' social media feeds. While this strategy places the advertisements in front of the users, the users often just scroll or swipe past the advertisements to the posts that attract their attention. Thus, the advertisements are often ignored by the users or given less than a second of time in front of the users to attract the users' attention before being skipped.

To overcome such problems, methods and systems are described herein for enhancing a social media post with a content item. In particular, the embodiments described herein provide for receiving a social media post and extracting, from the social media post, a first content item (e.g., a still image). The methods and systems then identify, in a frame of the first content item, a portion of the frame that is a non-focus portion (e.g., a background portion), and identify a plurality of content items that fit within the non-focus portion of the frame. In order to target the added content to the audience of the social media post, the methods and systems identify a content preference of an audience of the social media post and determine an estimated length of time that the audience will view the social media post. The methods and systems then select a second content item, from the plurality of content items, that matches the content preference of the audience and has a duration that does not exceed the estimated length of time. Thereafter, the methods and systems generate an enhanced social media post by overlaying the second content item onto the non-focus portion of the frame and display the enhanced social media post.

In some embodiments, the methods and systems identify a focus portion of the frame and a background portion of the frame and select a portion of the frame that is not obscured by the focus portion of the frame as the non-focus portion of the frame. The methods and systems may further identify an object in the frame that extends beyond an edge of the frame and select a portion of the frame that includes the object as the non-focus portion of the frame. The methods and systems may also determine dimensions of the non-focus portion of the frame and identify a plurality of content items having dimensions that are the same as or smaller than the dimensions of the non-focus portion of the frame. In further embodiments, the methods and systems retrieve a list of followers of a user from whom the social media post was received, identify a content preference shared by the followers, and select the content preference shared by the followers as the content preference of the audience of the social media post. In still further embodiments, the methods and systems retrieve, for each of the followers, at least one value corresponding to a duration that a respective follower has previously viewed a social media post, calculate an average of the values, and select the average of the values as the estimated length of time that the audience will view the social media post.

The methods and systems described herein provide an improved process for identifying content that is relevant to the audience of a social media post and generating an enhanced social media post including the original content of the post and the additional content that is relevant to the audience. The process increases the efficiency of adding additional content relevant to an audience of a social media post to content included in the post, both for the user and for the computing resources needed to perform the processes described herein. To that end, the methods and systems provide for selecting additional content that is both relevant to the audience of the post and that fits into non-focus portions of the content of the post without obscuring the portion(s) of the post to which the user intended to attract the audience's attention.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
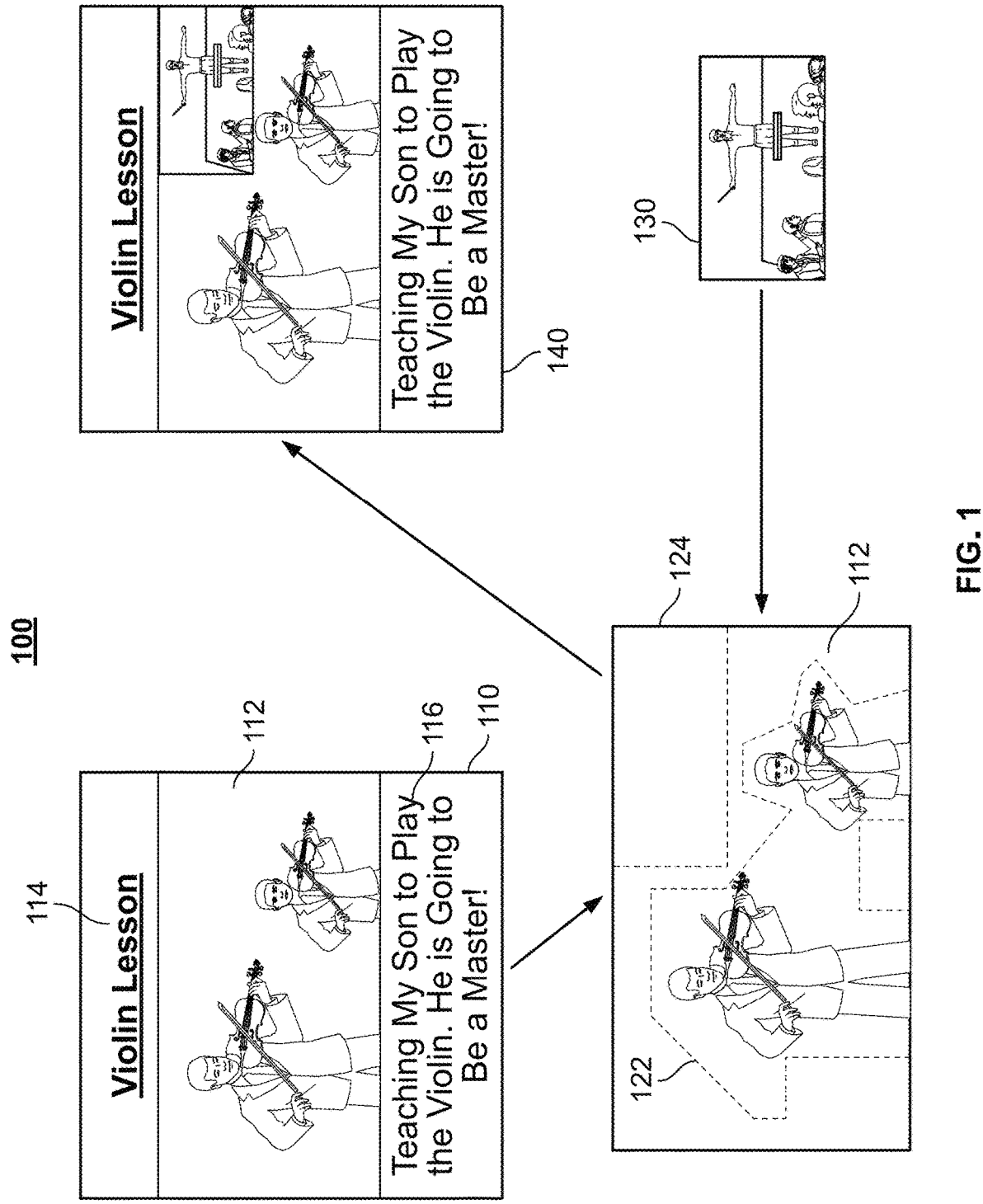
FIG. 1 shows an illustrative scenario for enhancing the social media post with content that is relevant to the audience of the post, in accordance with some embodiments of the disclosure.

FIG. 1 shows an illustrative scenario 100 for enhancing the social media post with content that is relevant to the audience of the post. As shown in FIG. 1, a social media post 110 includes a content item 112 and may optionally include a title 114 and message 116. Social media post 110 further includes metadata (not shown in FIG. 1) describing social media post 110 and/or content item 112. For example, the metadata may include tags or identifiers describing content 112. In the example shown in FIG. 1, the metadata may include the tags "father," "son," "music," "violin," "lesson," and "teach." The tags may be determined based on content 112, such as via image processing and object recognition techniques, and/or based on title 114 and message 116. Content item 112 may be a still image, a graphics interchange format (GIF) or similar format image, a video, and/or any other type of visual content that may be included in a social media post. Content item 112 includes at least one focus portion 122 and at least one non-focus portion 124. Focus portion 122 is a portion of content item 112 that includes the subject of the content and the area where an audience of the social media post is intended to focus their attention). Non-focus portion 124 is a portion of content item 112 that does not include the subject and/or includes the background or other objects that are not intended to draw the audience's attention.

Figure 4A:
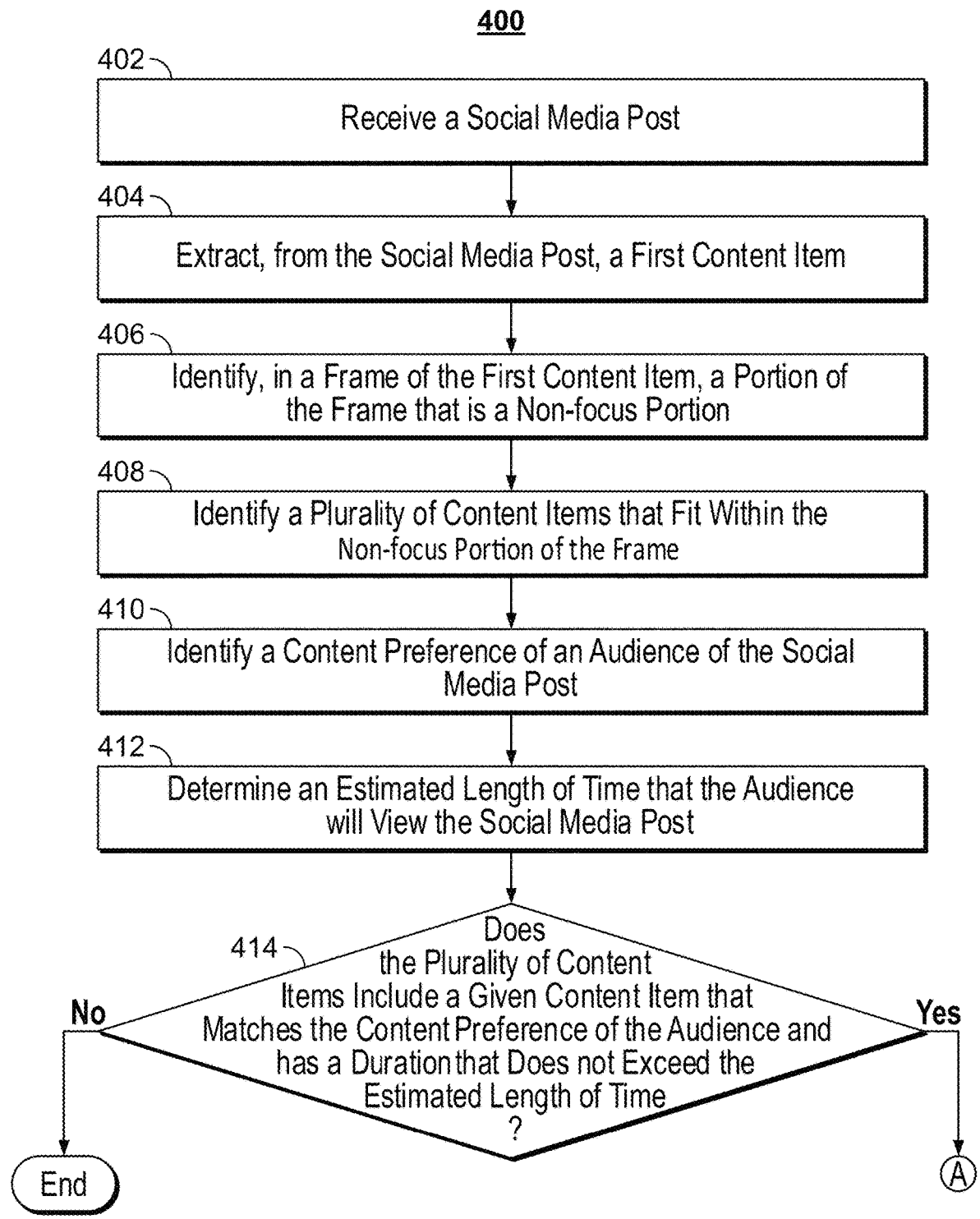
FIGS. 4A and 4B show a flowchart of an illustrative process for enhancing the social media post with content that is relevant to the audience of the post, in accordance with some embodiments of the disclosure.
Figure 4B:
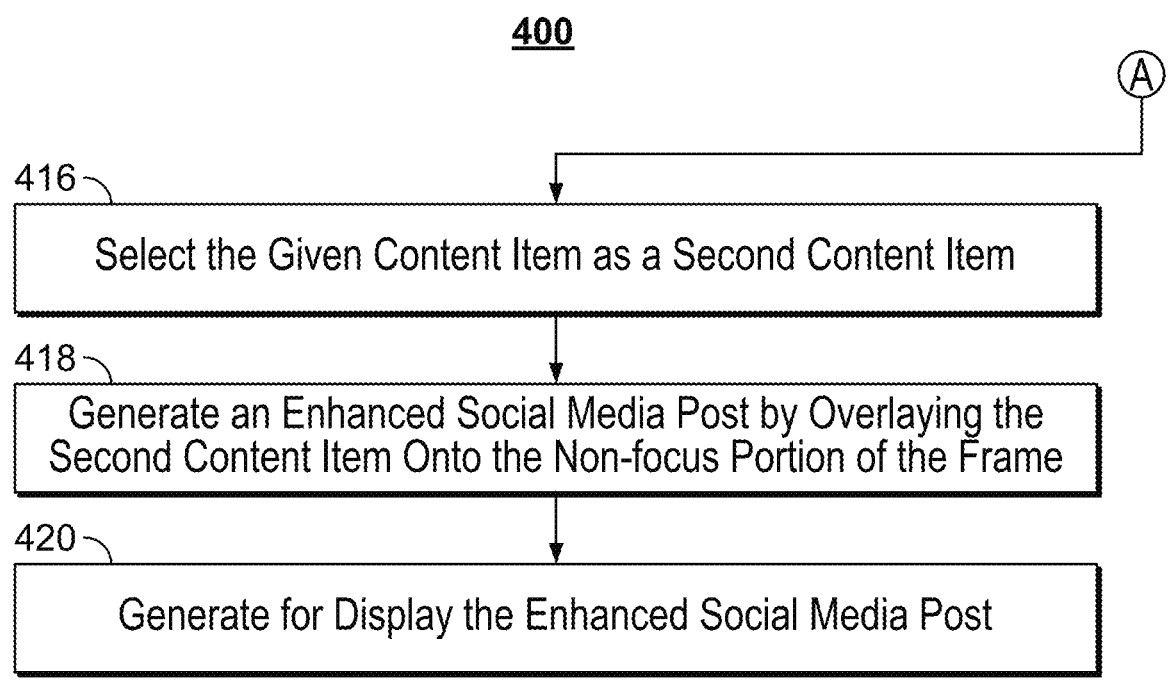

As described further below with reference to FIGS. 4A, 4B, and 5, content item 112 is enhanced by overlaying a second content item 130 onto non-focus portion 124 to generate an enhanced social media post 140. Second content item 130 may be all or a portion of a video, a still image, an advertisement, a GIF, etc. In some embodiments, second content item 130 is a content item that is relevant to content item 112. For example, in the illustration shown in FIG. 1, content item 112 is video of a father and son playing violin, and second content item 130 is a video of an orchestra playing the same musical composition as the father and son. In another example (not shown in FIG. 1), second content item 130 could be an image of the sheet music of the musical composition played by the father and son. In yet another example (not shown in FIG. 1), second content item 130 could be an advertisement for violin lessons. In other embodiments, second content item 130 is unrelated to content item 112 and is selected purely based on the content preference of the audience of social media post 110, as described further below.

Figure 2:
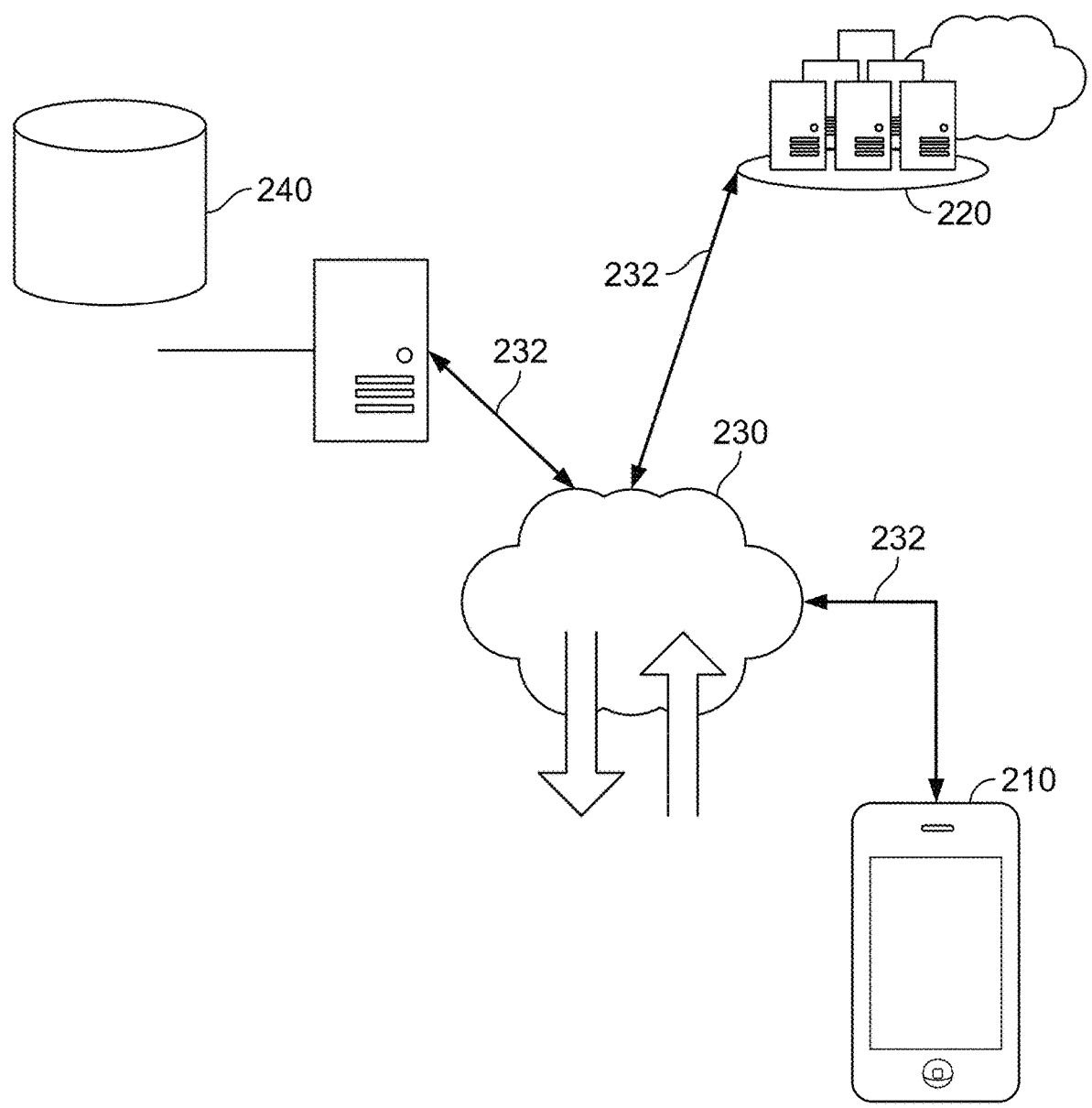
FIG. 2 shows an illustrative system for enhancing the social media post with content that is relevant to the audience of the post, in accordance with some embodiments of the disclosure.

FIG. 2 shows an illustrative system for enhancing the social media post with content that is relevant to the audience of the post. In particular, FIG. 2 shows a system 200 where a media device 210 retrieves second content item 130 and/or the metadata associated with second content item 130 from a content source 240 via a communications path 232. Content source 240 may be any server or other computing device from which content items (such as second content item 130) and/or related metadata associated with content items may be retrieved. For example, content source 240 may be a cloud storage platform by means of which content items are collected, stored, and distributed, and from which media device 210 may retrieve second content item 130. In that regard, the communications path 232 may be any network or communication equipment or medium by means of which media device 210 can communicate with (e.g., submit a query to and/or retrieve data or content from) content source 240. In one illustrative example, the communications path 232 includes devices connected via the Internet.

A content enhancement application may be implemented on any one or a combination of media device 210, content source 240, and/or an application server 220, each of which may function as a stand-alone device or may be part of a network of devices. Various network configurations of devices may be implemented and are discussed in more detail below. In system 200, there may be multiple media devices 210, but only one is shown in FIG. 2 to avoid overcomplicating the drawing. In addition, multiple users may each utilize more than one type of media device 210 and also more than one of each type of media device 210.

Media device 210 may be coupled to a communication network 230. Communication network 230 may be one or more networks including the Internet, a mobile phone network, a mobile voice or data network (e.g., a 4G or LTE network), a cable network, a public switched telephone network, or other types of communication networks or combinations of communication networks. Media device 210, content source 240, and application server 220 may be connected to the communication network 230 via one or more communications paths 232, such as a satellite path, a fiber-optic path, a cable path, a path that supports Internet communications (e.g., IP), free-space connections (e.g., for wireless signals), and/or any other suitable wired or wireless communications path or combination of such paths.

Although communications paths 232 are not drawn directly between media device 210 and content source 240 or application server 220, these devices may communicate directly with each other via communications paths 232, such as short-range point-to-point communications paths, for example USB cables, IEEE 1394 cables, wireless paths (e.g., BLUETOOTH, infrared, IEEE 802-11x, etc.), or other short-range communication via wired or wireless paths. BLUETOOTH is a certification mark owned by Bluetooth SIG, INC. The devices may also communicate with each other directly through an indirect path via communication network 230.

System 200 may include more than one content source 240, but only one is shown in FIG. 2 to avoid overcomplicating the drawing. Content source 240 includes a database, table, or other data structure, storing a list of each content item on content source 240, and/or metadata associated with each content item. The metadata may include descriptions, such as tags or identifiers describing the associated content items. Content source 240, either in the database or in a separate data structure, also stores the content items referred to in the database, or stores links (e.g., hyperlinks, addresses, credentials, etc.) to access the content items referred to in the database on a separate device or server (not shown in FIG. 2).

The content enhancement application may be, for example, a stand-alone application implemented on media device 210 described above. For example, the content enhancement application may be implemented as software or a set of executable instructions, which may be stored in storage 308 (described below with reference to FIG. 3) and executed by control circuitry 304 (described below with reference to FIG. 3) of media device 210. In some embodiments, the content enhancement application is a client/server-based application where only a client application resides on media device 210, and a server application resides on another device, such as application server 220. For example, the content enhancement application may be implemented partially as a client application on control circuitry 304 of media device 210 and partially on application server 220 as a server application running on control circuitry 304 of application server 220. When executed by control circuitry 304 of application server 220, the content enhancement application may instruct control circuitry 304 of media device 210 to transmit content item 112 and/or social media post 110 to application server 220, which then identifies a position of non-focus portion 124 within a frame of content item 112, determines the dimensions of non-focus portion 124, and transmits the identified position and dimensions of non-focus portion 124 back to media device 210. Media device 210 may then query content source 240 for other content items that fit within the dimensions of non-focus portion 124 and are relevant to an audience of social media post 110.

While system 200 is shown in FIG. 2 as including only media device 210, content source 240, and application server 220, those skilled in the art will appreciate that system 200 may further include various other devices. In some embodiments, media device 210 may operate in a cloud computing environment to access cloud services. In a cloud computing environment, various types of computing services for content sharing, storage, or distribution are provided by a collection of network-accessible computing and storage resources, referred to as "the cloud." Media device 210 may be a cloud client that relies on cloud computing for application delivery, or media device 210 may have some functionality without access to cloud resources. For example, some applications running on media device 210, such as the content enhancement application, may be cloud applications, that is, applications delivered as a service over the Internet, while other applications may be stored and run on media device 210. In some embodiments, media device 210 uses cloud resources for processing operations, such as the processing operations performed by processing circuitry 306 described in relation to FIG. 3. For example, media device 210 may rely on application server 220 and/or another cloud resource to identify the position of non-focus portion 124 within content item 112 and/or determine a content preference of the audience of social media post 110, and retrieve second content item 130 from content source 240 and/or another cloud resource.

Figure 3:
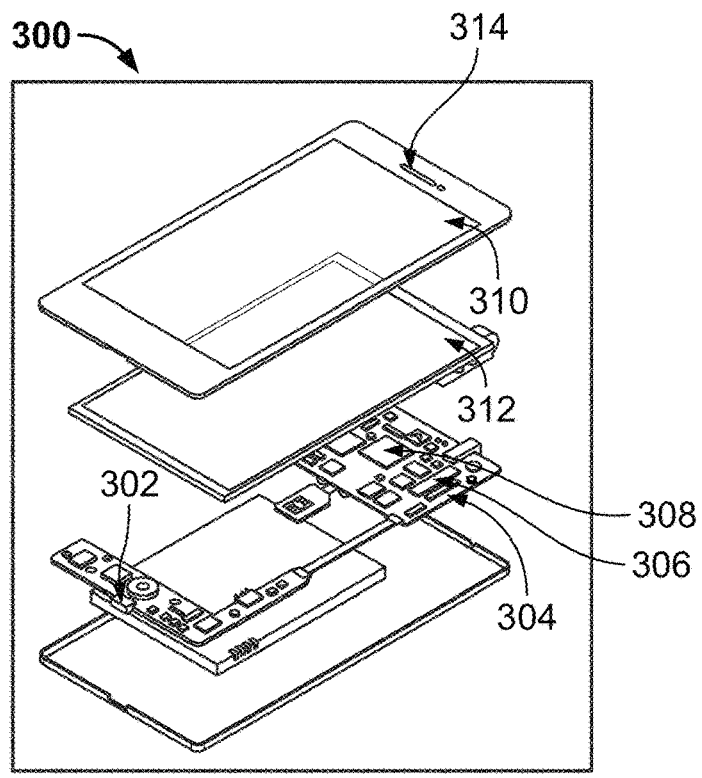
FIG. 3 shows a diagram of illustrative devices of the system of FIG. 2, in accordance with some embodiments of the disclosure.
Figure 3:
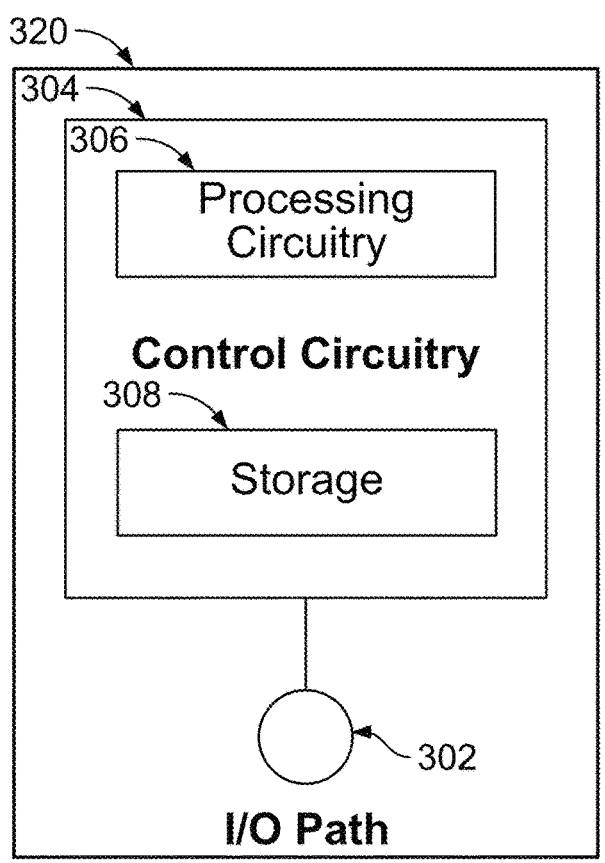

FIG. 3 shows a generalized embodiment of an illustrative media device 300. As depicted, media device 300 may be a smartphone or tablet. Media device 300 may receive content and data via an input/output (I/O) path 302. I/O path 302 may provide user input, user preferences, social media post 110, content item 112, second content item 130, and/or metadata related to any of the aforementioned to control circuitry 304, which includes processing circuitry 306 and storage 308. Control circuitry 304 may send and receive commands, requests, and other suitable data using I/O path 302. I/O path 302 may connect control circuitry 304 (and specifically processing circuitry 306) to one or more communications paths (described below). I/O functions may be provided by one or more of these communications paths, but a single path is shown in FIG. 3 to avoid overcomplicating the drawing.

Control circuitry 304 may be based on any suitable processing circuitry, such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 306 is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 304 executes instructions for a content enhancement application stored in memory (i.e., storage 308). Specifically, control circuitry 304 may be instructed by the content enhancement application to identify a position and dimensions of non-focus portion 124 within content item 112, retrieve second content item 130, generate enhanced social media post 140, and/or perform the other functions described above and below.

In client/server-based embodiments, control circuitry 304 includes communications circuitry suitable for communicating with a content enhancement application server or other networks or servers. The instructions for carrying out the above-mentioned functionality may be stored on a server. Communications circuitry may include a cable modem, an integrated services digital network (ISDN) modem, a digital subscriber line (DSL) modem, a telephone modem, an Ethernet card, and/or a wireless modem for communications with other equipment, or any other suitable communications circuitry. Such communications may involve the Internet or any other suitable communication networks or paths. In addition, the communications circuitry may include circuitry that enables peer-to-peer communication of media devices, or communication of media devices in locations remote from each other.

The memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, hard drives, optical drives, solid state devices, quantum storage devices, or any other suitable fixed or removable storage devices, and/or any combination of the same. Nonvolatile memory may also be used. Cloud-based storage, described in relation to FIG. 2, may be used to supplement storage 308 or instead of storage 308.

The circuitry described herein may execute instructions included in software running on one or more general purpose or specialized processors. Multiple circuits may be provided to handle simultaneous processing functions. If storage 308 is provided as a separate device from media device 300, the circuitry may be associated with storage 308.

A user may send instructions to control circuitry 304 using a user input interface 310 of media device 300. User input interface 310 may be any suitable user interface, such as a remote control, mouse, trackball, keypad, keyboard, touchscreen, touchpad, stylus input, joystick, or other user input interfaces. Media device 300 may further include a display 312 and speakers 314. Display 312 may be a touchscreen or touch-sensitive display. In such circumstances, user input interface 310 may be integrated with or combined with display 312. A camera, microphone, or other visual or voice recognition interface may also be used to receive user input. Speakers 314 may be provided as integrated with other elements of media device 300.

The content enhancement application may be implemented using any suitable architecture. For example, it may be a stand-alone application wholly implemented on media device 300. The content enhancement application and/or any instructions for performing any of the embodiments discussed herein may be encoded on computer-readable media. Computer-readable media include any media capable of having computer-executable instructions encoded thereon that, when executed by a processor, cause a device, such as media device 300, to perform the instructed operations. In some embodiments, the content enhancement application is a client/server-based application. Data for use by a thick or thin client implemented on media device 300 is retrieved on demand by issuing requests to a server remote from media device 300, as described above. Those skilled in the art will appreciate that media device 210 of FIG. 2 may be implemented as media device 300 of FIG. 3.

FIG. 4 is a flowchart of an illustrative process for enhancing the social media post with content that is relevant to the audience of the post, in accordance with some embodiments of the disclosure. A process 400 for enhancing the social media post with content that is relevant to the audience of the post may begin at block 402, where control circuitry, such as control circuitry 304, receives a social media post. For example, control circuitry 304 of media device 210 may receive an input of social media post 110 and/or a user selection, such as via user input interface 310, of social media post 110.

At block 404, control circuitry 304 extracts, from the social media post received at block 402, a first content item. For example, control circuitry 304 of media device 210 may extract content item 112 from social media post 110. In some embodiments, control circuitry 304 parses the data of social media post 110 and identifies, in the data, data corresponding to content item 112. Control circuitry 304 then extracts the data corresponding to content item 112 from the data of social media post 110.

At block 406, control circuitry 304 identifies, in a frame of the first content item, a portion of the frame that is a non-focus portion. For example, control circuitry 304 of media device 210 may identify non-focus portion 124 in a frame of content item 112. In some embodiments, control circuitry 304 identifies a focus portion, such as focus portion 122, of the frame of content item 112, and selects a portion of the frame that is not obscured by focus portion 122 as non-focus portion 124. In another embodiment, control circuitry 304 identifies an object, in the frame of content item 112, that extends beyond an edge of the frame, and selects a portion of the frame that includes the object as non-focus portion 124. For example, in the illustration shown in FIG. 1, control circuitry 304 may identify a door in the frame of content item 112 and determine that the door extends beyond an edge of the frame, and thus select the portion of the frame that includes the door as non-focus portion 124.

At block 408, control circuitry 304 identifies a plurality of content items that fit within the non-focus portion of the frame. For example, control circuitry 304 of media device 210 may identify a plurality of content items that fit within non-focus portion 124. In some embodiments, control circuitry 304 determines dimensions of non-focus portion 124 and identifies a plurality of content items having dimensions that are the same as or smaller than the dimensions of non-focus portion 124.

At block 410, control circuitry 304 identifies a content preference of an audience of the social media post. For example, control circuitry 304 of media device 210 may identify a content preference of the audience of social media post 110. In some embodiments, control circuitry 304 retrieves a list of followers of a user from whom social media post 110 was received, identifies a content preference shared by the followers, and selects the content preference shared by the followers as the content preference of the audience of social media post 110. Control circuitry 304 may identify the user from whom social media post 110 was received based on a device from which social media post 110 was received, and/or based on an account (such as a social network account) from which social media post 110 was received or to which social media post 110 is posted.

At block 412, control circuitry 304 determines an estimated length of time that the audience will view the social media post. For example, control circuitry 304 of media device 210 may determine an estimated time that the audience will view social media post 110. In some embodiments, control circuitry 304 retrieves, for some or all of the followers in the list retrieved at block 410, at least one value corresponding to a duration that a respective follower has previously viewed a social media post, calculates an average of the values, and selects the average of the values as the estimated length of time that the audience will view social media post 110.

At block 414, control circuitry 304 determines whether the plurality of content items, as identified at block 408, include a given content item that matches the content preference of the audience, as identified at block 410, and that has a duration that does not exceed the estimated length of time, as determined at block 412. For example, control circuitry 304 of media device 210 may identify, from the plurality of content items, a first subset of content items that match the content preference of the audience, and identify, from the first subset, a second subset of content items that has a duration that is the same as or shorter than the estimated length of time. If the second subset of content items includes at least one content item, control circuitry 304 determines that the plurality of content items include at least one content item that qualifies as the given content item. In response to determining that the plurality of content items does not include the given content item, process 400 ends. In response to determining that the plurality of content items does include at least one content item that qualifies as the given content item, process 400 proceeds to block 416.

At block 416, control circuitry 304 selects the given content item as a second content item. For example, control circuitry 304 of media device 210 selects the given content item as second content item 130. In some embodiments, each content item of the plurality of content items includes a plurality of frames, and control circuitry 304 selects second content item 130 from among the plurality of content items by identifying a subset of the plurality of frames, of a given content item of the plurality of content items, that include content matching the content preference of the audience, as determined at block 410. Control circuitry then determines whether a segment of the given content item, the segment including the subset of the plurality of frames, has a duration that does not exceed the estimated length of time, as determined at block 412, and in response to determining that the segment has a duration that does not exceed the estimated length of time, selects the segment as second content item 130. In another embodiment, control circuitry 304 determines whether metadata, of a given content item of the plurality of content items, includes a description of the given content item that matches a description of content item 112, and in response to determining that the metadata of the given content item includes the description that matches the description of content item 112, selects the given content item as second content item 130.

At block 418, control circuitry 304 generates an enhanced social media post by overlaying the second content item, as selected at block 416, onto the non-focus portion of the frame, as identified at block 406. For example, control circuitry 304 of media device 210 may generate enhanced social media post 140 by overlaying second content item 130 onto non-focus portion 124. In some embodiments, control circuitry 304 may place second content item 130 over non-focus portion 124 in content item 112.

At block 420, control circuitry 304 generates for display the enhanced social media post generated at block 418. For example, control circuitry 304 of media device 210 generates for display enhanced social media post 140. In some embodiments, control circuitry 304 causes display 312 of media device 210 to display enhanced social media post 140. In other embodiments, control circuitry 304 causes enhanced media post 140 to be transmitted to a server of the social network and/or other media devices.

Figure 5:
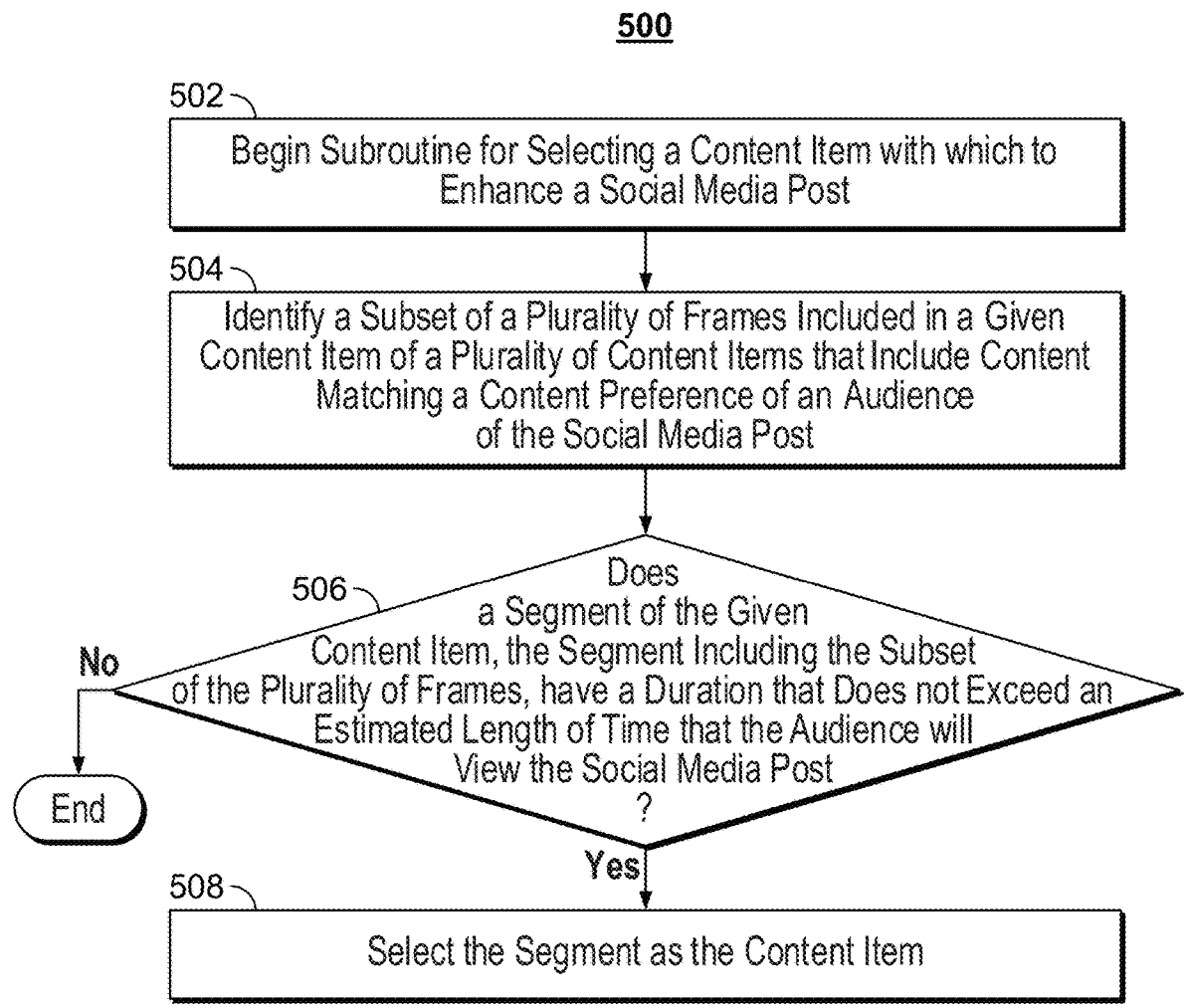
FIG. 5 is a flowchart of a detailed illustrative process for selecting a content item with which to enhance a social media post, in accordance with some embodiments of the disclosure.

FIG. 5 is a flowchart of a detailed illustrative process for selecting a content item with which to enhance a social media post, in accordance with some embodiments of the disclosure. A process 500 for selecting a content item with which to enhance a social media post may begin at block 502. At block 504, control circuitry 304 identifies a subset of a plurality of frames included in a given content item of a plurality of content items that include content matching a content preference of an audience of the social media post. For example, control circuitry 304 of media device 210 may identify a subset of a plurality of frames included in a given content item of a plurality of content items that include content matching the content preference of the audience of social media post 110, as identified at block 410 (FIG. 4).

At block 506, control circuitry 304 determines whether a segment of the given content item, the segment including the subset of the plurality of frames identified at block 504, has a duration that does not exceed an estimated length of time that the audience will view the social media post. For example, control circuitry 304 of media device 210 may determine whether a segment of the given content item has a duration that does not exceed the estimated length of time determined at block 412 (FIG. 4). In response to determining that the segment has a duration that exceeds the estimated length of time, process 500 ends. In response to determining that the segment has a duration that does not exceed the estimated length of time, process 500 proceeds to block 508.

At block 508, control circuitry 304 selects the segment as the content item. For example, control circuitry 304 of media device 210 selects the segment as second content item 130.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted, the systems and/or methods described above may be applied to, or used in accordance with, other systems and/or methods.

What is claimed is:

1. A method comprising:
    receiving a first content item, the first content item comprising a plurality of frames;
    identifying a non-focus area of a first frame of the first content item;
    overlaying a second content item onto the non-focus area of the first frame of the first content;
    identifying a non-focus area of a second frame of the first content item, wherein the non-focus area of the second frame is different from the non-focus area of the first frame; and
    overlaying the second content item onto the non-focus area of the second frame of the first content item,
    wherein the non-focus area of the first frame includes an object that extends beyond an edge of the first frame of the first content item.

2. The method of claim 1, wherein the first content item comprises at least one of an image, a video, or a graphical interchange format (GIF).

3. The method of claim 1, further comprising:
    extracting the first content item from a social media post retrieved from a content source.

4. The method of claim 3, further comprising:
    identifying a content preference of an audience of the social media post; and
    selecting the second content item from a plurality of content items that matches the content preference of the audience.

5. The method of claim 3, further comprising:
    determining an estimated length of time that an audience will view the social media post; and
    selecting the second content item from a plurality of content items having a duration that does not exceed the estimated length of time.

6. The method of claim 1, further comprising:
    determining dimensions of the non-focus area of the first frame; and
    identifying a plurality of content items having dimensions that are the same or smaller than the dimensions of the non-focus area of the first frame.

7. The method of claim 6, further comprising:
    determining dimensions of the non-focus area of the second frame; and
    identifying a plurality of content items having dimensions that are the same or smaller than the dimensions of the non-focus area of the second frame;
    wherein the dimensions of the non-focus area of the second frame is different from the dimensions of the non-focus area of the first frame.

8. The method of claim 1, wherein the non-focus area of the first frame excludes a focus area of the first frame, and wherein the non-focus area of the second frame excludes a focus area of the second frame.

9. The system of claim 8, wherein the focus area of the first frame excluded from the non-focus area of the first frame comprises an area corresponding with a subject of the first content item and an area of the first frame surrounding the subject, and wherein the focus area of the second frame excluded from the non-focus area of the second frame comprises an area corresponding with the subject of the first content item and an area of the second frame surrounding the subject.

10. A system comprising:
control circuitry configured to:
receive a first content item, the first content item comprising a plurality of frames;
identify a non-focus area of a first frame of the first content item;
overlay a second content item onto the non-focus area of the first frame of the first content;
identify a non-focus area of a second frame of the first content item, wherein the non-focus area of the second frame is different from the non-focus area of the first frame; and
overlay the second content item onto the non-focus area of the second frame of the first content item,
wherein the non-focus area of the first frame includes an object that extends beyond an edge of the first frame of the first content item.

11. The system of claim 10, wherein the first content item comprises at least one of an image, a video, or a graphical interchange format (GIF).

12. The system of claim 10, wherein the control circuitry is further configured to:
extract the first content item from a social media post retrieved from a content source.

13. The system of claim 12, wherein the control circuitry is further configured to:
identify a content preference of an audience of the social media post; and
select the second content item from a plurality of content items that matches the content preference of the audience.

14. The system of claim 12, wherein the control circuitry is further configured to:
determine an estimated length of time that an audience will view the social media post; and
select the second content item from a plurality of content items having a duration that does not exceed the estimated length of time.

15. The system of claim 10, wherein the control circuitry is further configured to:
determine dimensions of the non-focus area of the first frame; and
identify a plurality of content items having dimensions that are the same or smaller than the dimensions of the non-focus area of the first frame.

16. The system of claim 15, wherein the control circuitry is further configured to:
determine dimensions of the non-focus area of the second frame; and
identify a plurality of content items having dimensions that are the same or smaller than the dimensions of the non-focus area of the second frame;
wherein the dimensions of the non-focus area of the second frame is different from the dimensions of the non-focus area of the first frame.

17. The system of claim 10, wherein the non-focus area of the first frame excludes a focus area of the first frame, and wherein the non-focus area of the second frame excludes a focus area of the second frame.

18. The system of claim 17, wherein the focus area of the first frame excluded from the non-focus area of the first frame comprises an area corresponding with a subject of the first content item and an area of the first frame surrounding the subject, and
wherein the focus area of the second frame excluded from the non-focus area of the second frame comprises an area corresponding with the subject of the first content item and an area of the second frame surrounding the subject.

19. A method comprising:
receiving a first content item, the first content item comprising a plurality of frames;
identify a non-focus area of a first frame of the first content item;
overlaying a second content item onto the non-focus area of the first frame of the first content;
identifying a non-focus area of a second frame of the first content item, wherein the non-focus area of the second frame is different from the non-focus area of the first frame; and
overlaying the second content item onto the non-focus area of the second frame of the first content item,
wherein the non-focus area of the second frame includes an object that extends beyond an edge of the second frame of the first content item.

20. A system comprising:
control circuitry configured to:
receive a first content item, the first content item comprising a plurality of frames;
identify a non-focus area of a first frame of the first content item;
overlay a second content item onto the non-focus area of the first frame of the first content;
identify a non-focus area of a second frame of the first content item, wherein the non-focus area of the second frame is different from the non-focus area of the first frame; and
overlay the second content item onto the non-focus area of the second frame of the first content item,
wherein the non-focus area of the second frame includes an object that extends beyond an edge of the second frame of the first content item.

* * * * *

UNITED STATES PATENT AND TRADEMARK OFFICE
CERTIFICATE OF CORRECTION

PATENT NO. : 11,329,937 B2
APPLICATION NO. : 17/170365
DATED : May 10, 2022
INVENTOR(S) : Madhusudhan Srinivasan Page 1 of 1

It is certified that error appears in the above-identified patent and that said Letters Patent is hereby corrected as shown below:

On the Title Page

In the Abstract, item (57), Line 5, add --a-- before "first frame of the first content item is identified."

In the Claims

In Claim 9, at Column 10, Line 63, delete "system" and add --method--

Signed and Sealed this
Tenth Day of February, 2026

John A. Squires
*Director of the United States Patent and Trademark Office*